PLOT OF OPERATOR

TIME

INVENTOR
Claude W. Horton

BY Stevens, Davis, Miller & Mosher
ATTORNEYS

Oct. 2, 1962 C. W. HORTON 3,056,945
PROCESSING SEISMIC TRACES AND APPARATUS THEREFOR
Filed April 16, 1959 4 Sheets-Sheet 3

FREQUENCY RESPONSE OF OPERATOR

INVENTOR
*Claude W. Horton*

BY *Stevens, Davis, Miller & Mosher*
ATTORNEYS

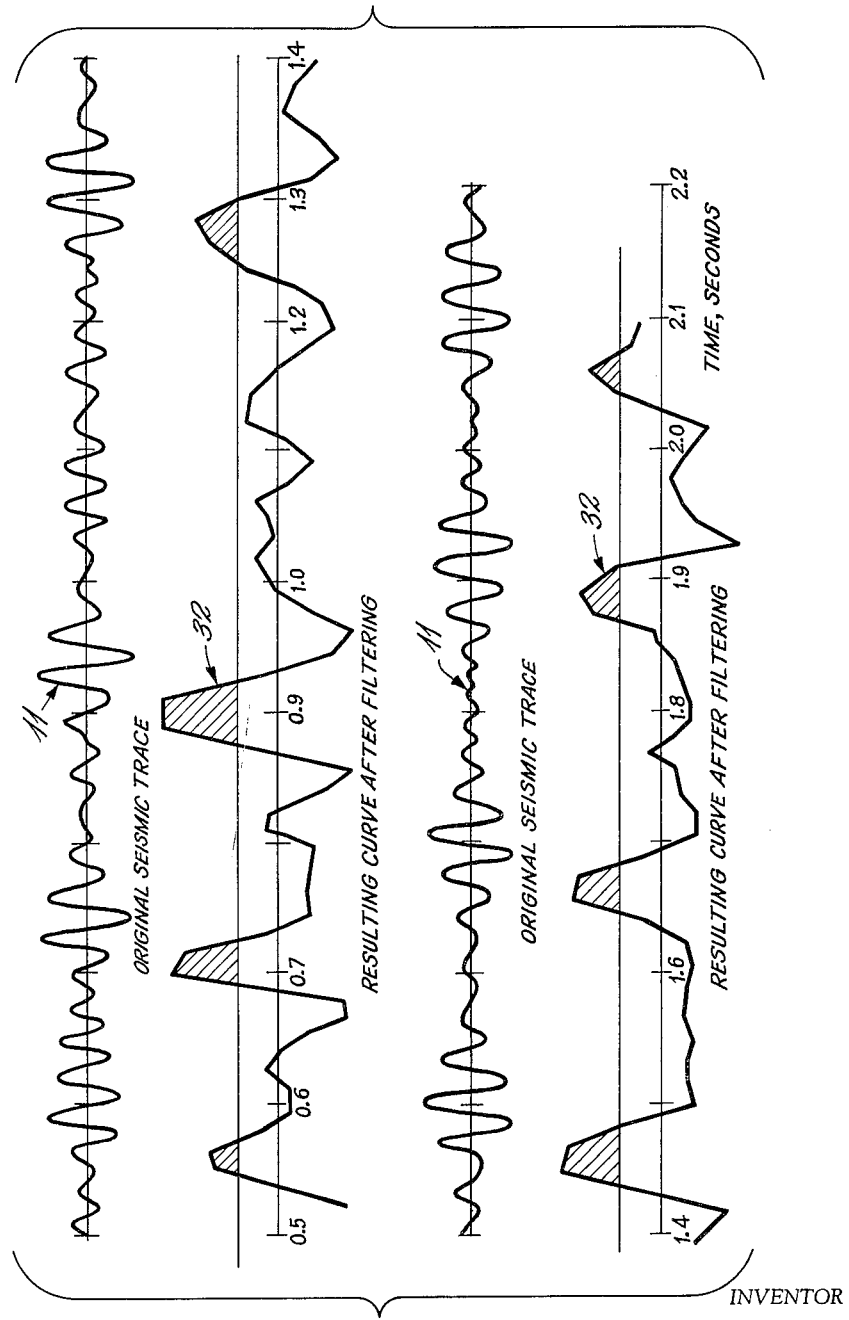

United States Patent Office 3,056,945
Patented Oct. 2, 1962

3,056,945
PROCESSING SEISMIC TRACES AND
APPARATUS THEREFOR
Claude W. Horton, Austin, Tex., assignor to Texas Instruments Incorporated, Dallas, Tex., a corporation of Delaware
Filed Apr. 16, 1959, Ser. No. 806,840
3 Claims. (Cl. 340—15.5)

This invention relates to a new and improved method and apparatus for processing a seismic trace to detect the reflection in the seismic trace.

Methods of detection of the prior art are needlessly complicated by the fact that seismic traces contain oscillations which are deemed to be the character of the reflections in the trace. The present invention is based on the concept that these oscillations appearing in the trace are not part of the reflections at all, but are merely the carrier frequency which is amplitude modulated by the reflections. From this point of view, it is evident that detection of a reflection is essentially a demodulation technique.

Basically, the method of the invention comprises sampling the absolute values of the maximum and minimum and generating a function, the periodic sequential samples of which are these absolute values in the sequence in which they occur in the seismic trace. The function is generated by detecting the axis crossings of the seismic trace and then sampling the absolute value of the trace a predetermined time interval after the times of the axis crossings. The predetermined time interval selected is the average time interval from an axis crossing to a peak or valley of a reflection for that particular area. The generated function is then cross correlation filtered with an operator. This cross correlation filtering passes a band of frequencies in the manner of a band pass filter.

The apparatus of the invention comprises a full wave rectifier to which the seismic trace is to be applied and an amplifier, limiter, and differentiator combination connected to provide pulses at the times of the axis crossings. These pulses are used to actuate an analogue gate which samples the output of the full wave rectifier the selected predetermined time interval after the applied pulses. The output samples from the analogue gate will be the sequential samples of the function which is to be cross correlation filtered.

Further objects and advantages of the invention will be understood as the following detailed description of a preferred embodiment of the invention unfolds and when taken in conjunction with the drawings wherein:

FIGURE 6 illustrates the results that are obtained with the invention.

Figure 1:
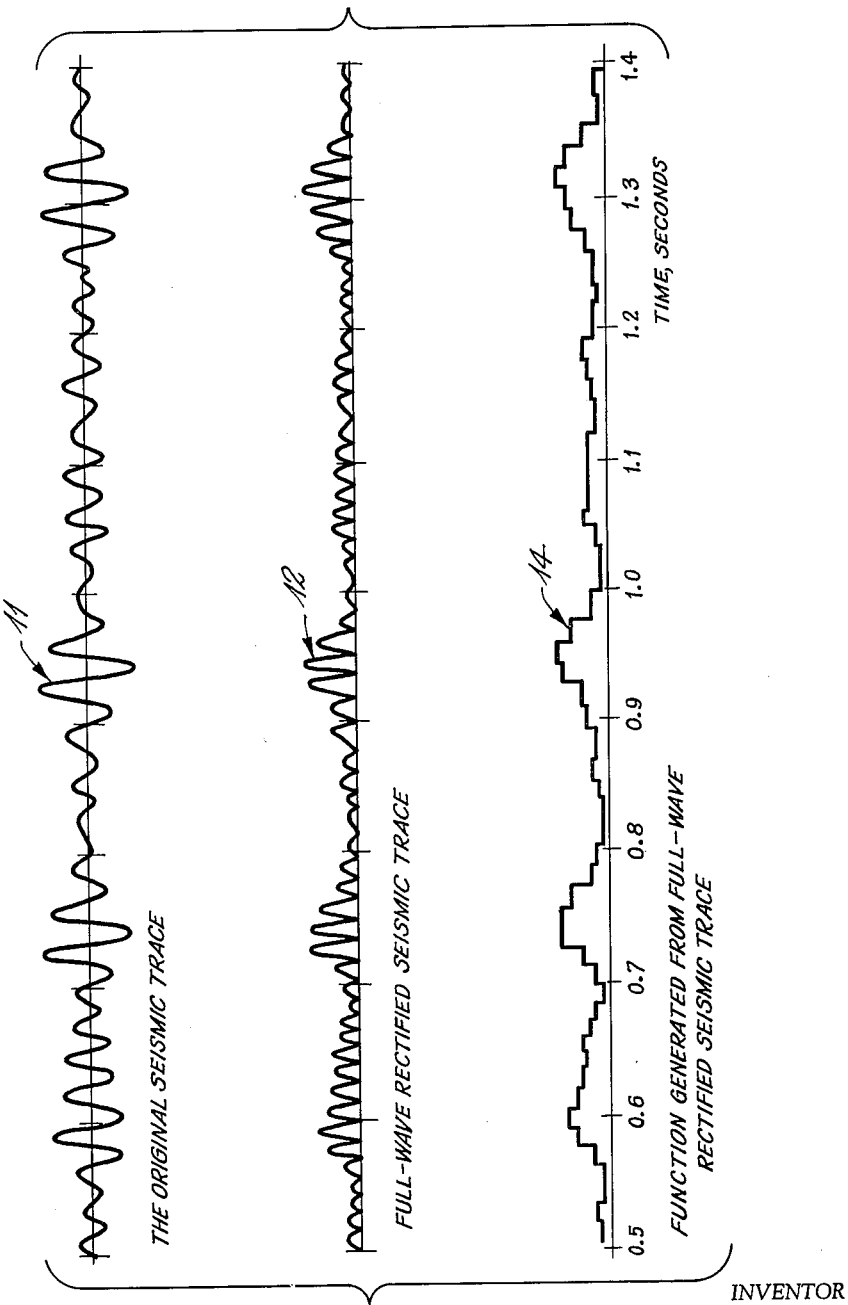
FIGURE 1 shows an original seismic trace, and some of the waveforms which are generated when the process of the invention is applied to this seismic trace.

Considering that the dominant frequency which occurs on a seismic trace is a carrier frequency which is amplitude modulated by the reflections and that the detection of the reflection is essentially a demodulation process in which the envelope of the seismic trace is recovered, the first step in treatment is naturally the full wave rectification of the seismic trace. In FIGURE 1 there is shown an example of an original seismic trace 11 and the waveform 12 resulting from the full wave rectification of the trace 11. Due to the full wave rectification, the valleys of the original seismic trace 11 will appear as peaks in waveform 12. If the waveform 12 is then used to generate a new function by sampling the absolute amplitudes of each of the peaks of the waveform 12 to provide a series of time related values and these time related values are plotted as the periodic samples of a new waveform, the output waveform 14 will be produced. The invention is based on the proposition that the waveform 14 contains all of the seismic information that the waveform 11 contains.

In considering the seismic trace as an amplitude modulated carrier, it should be noted that "carrier" in the seismic trace is not a pure tone, but is narrow band noise. Therefore, the axis crossings do not occur with strict periodicity but instead they have a statistical distribution about an average value. This fact does not prevent the application of standard demodulation techniques to the record.

An important characteristic of a reflection in a seismic trace is the shape of the reflection. Therefore, in detecting reflections in a seismic trace, it is important to take their shape into account. If the absolute values of the peaks and valleys of a reflection are normalized so that the maximum absolute value is unity and if then these normalized absolute values plotted in the order in which they occur at equally spaced increments along the abscissa or the time co-ordinates, the resulting curve, which we shall designate $A(t)$, will have a pronounced positive slope followed by a pronounced negative slope.

Figure 2:
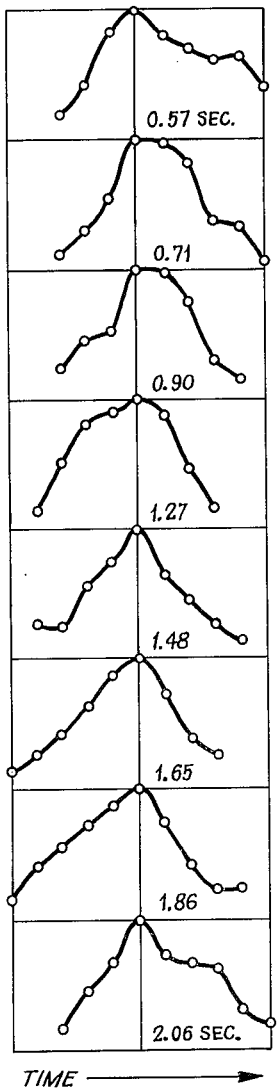
FIGURE 2 illustrates the characteristic shape of the reflections with the carrier frequency removed.

This shape is illustrated in FIGURE 2 which shows eight curves $A(t)$ which result from applying this operation to eight clear reflections in an actual seismic trace. If the derivative of a curve $A(t)$ is taken, the resulting curve will be characterized by a large postive portion followed by a large negative portion. On the average, the negative portion will lag the postive portion by 3 increments of spacing of the plotted points of the curve $A(t)$. This increment, which we shall designate W, it will be noted, represents the average time interval between the peaks and adjacent valleys or troughs of a reflection. Thus if the absolute values of the peaks and valleys of a seismic trace are read and plotted at equal increments, W, to provide a new function $f(t)$ then each reflection will show itself in the differential $f'(t)$ of the function $f(t)$ as a positive peak followed by a negative separated by approximately three increments of W.

A simple approximation of the first derivative of one of the curves $f(t)$ can be obtained by use of the formula:

$$f'(a) = -(\tfrac{1}{2}w)[3f(a) - 4f(a+w) + f(a+2w)]$$

in which $f'(a)$ is the value of the derivative $f'(t)$ at time $t=a$ and $f(a)$, $f(a+w)$, and $f(a+2w)$ are the values of $f(t)$ at times $t=a$, $t=a+w$, and $t=a+2w$ respectively. Because the derivative is very sensitive to experimental errors, in order to get a more reliable derivative curve, each derivative value should be averaged with the next succeeding value. This average derivative curve can be obtained from the formula:

$$[f'(a)+f'(a+w)]/2 = -\tfrac{1}{4}w[3f(a) \\ -f(a+w)-3(a+2w)+f(a+3w)]$$

which will give the value of the average derivative at time $t=a$. If this formula is used to give a series of time related values and these values plotted as a new function representing the average derivation of $f(t)$, the new reflections will be characterized in this average derivative function, as in the simple derivative function $f'(t)$, by a large positive portion followed after about three units of W by a large negative portion. To provide a function which makes the reflection more recognizable, the difference between the values making up this new average derivative function separated by three units of W are taken to provide a new set of time related values. If this new set of values are plotted as a function $\Phi(t)$, each reflection in the function $\Phi(t)$ will be characterized by having a substantially greater magnitude than the rest of the function and therefore will be easily detected. $\Phi(t)$ may be determined directly from $f(t)$ by means of the formula:

$$\Phi(a) = [f'(a) + f'(a+w)]/2 \\ - [f'(a+3w) + f'(a+4w)]/2 \\ = \tfrac{1}{4}w - [-3f(a) + f(a+w) + 3f(a+2w) \\ + 2f(a+3w) - f(a+4w) - 3f(a+5w) + f(a+6w)]$$

This formula gives the value of $\Phi(t)$ at time $t=a$ and if solved for each incremental time of $f(t)$, it will yield a series of time related values which when plotted will be $\Phi(t)$. Thus there is provided a method of processing a seismic trace to make the reflections more easily detected and picked. The reflections in the function $\Phi(t)$ will be clearly distinguishable, they being substantially greater in amplitude than the rest of the function $\Phi(t)$.

Figure 3:
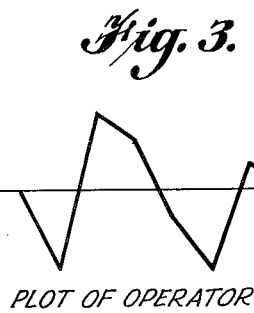
FIGURE 3 illustrates a plot of the operator used in the cross correlation filtering operation.
Figure 4:
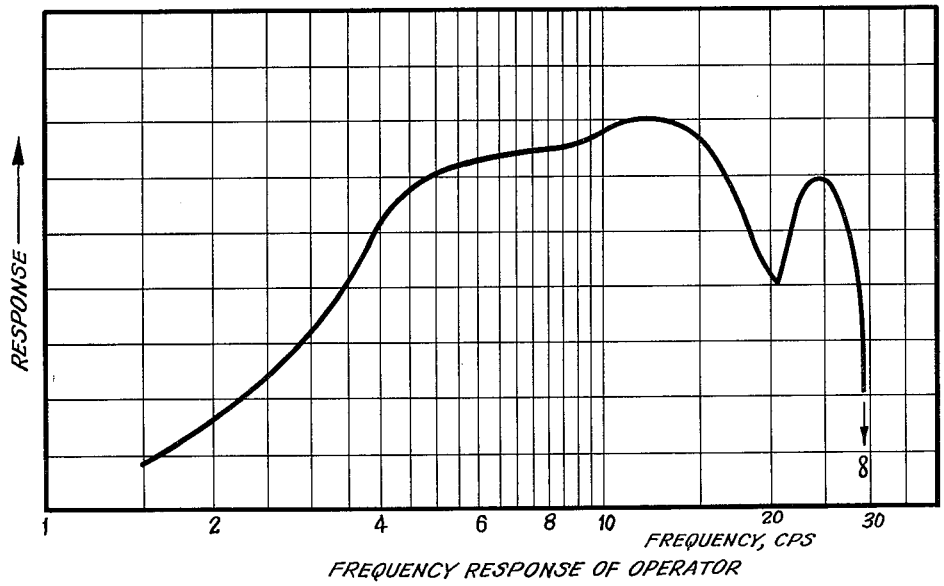
FIGURE 4 shows the frequency response of the cross correlation filter.

For the purpose at hand the factor $\tfrac{1}{4}w$ may be neglected. The above operation may be considered as cross correlating the function $f(t)$ with an operator whose coefficients are $-3, +1, +3, +2, -1, -3, +1$. A plot of this operator is shown in FIGURE 3. Every cross correlating operation may also be considered as a filtering operation. Thus the above operation on the function $f(t)$ is equivalent to filtering the function of $f(t)$. The frequency response of the cross correlation filter is shown in FIGURE 4. From this figure it will be observed that the filter is of the band pass variety and will pass a band of frequencies having a maximum response at 12 cycles per second. The location of the maximum response of the filter depends upon W. Essentially the practice of tying the operator to the axis crossings means that filter has a variable center frequency and in each sample the center frequency of the filter is forced to agree with the dominant frequency of the section of the seismic trace that is being analyzed.

Figure 5:
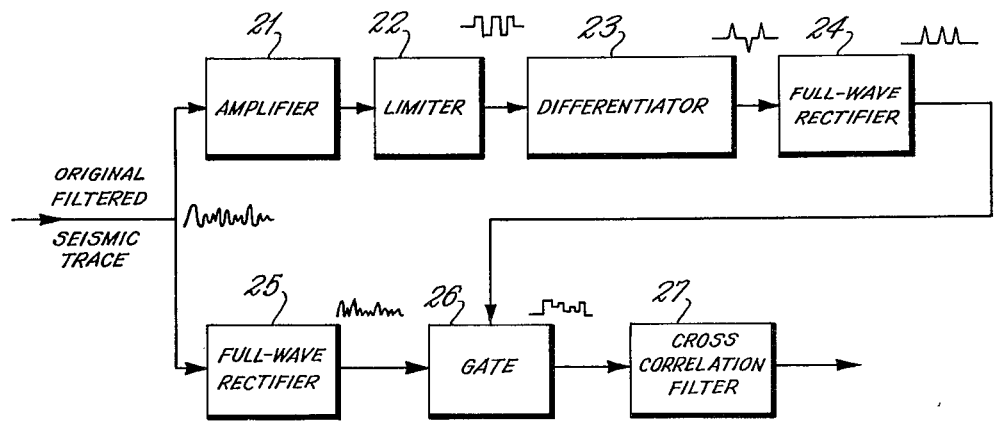
FIGURE 5 shows a block diagram of the apparatus of the invention.

The above described operations can be carried out analogally or digitally. In the preferred embodiment a combination of both is used. FIGURE 5 illustrates the preferred embodiment of the method and apparatus. The original unfiltered seismic trace is amplified by amplifier 21. The amplified seismic trace is then limited by the limiter 22. The output of the limiter 22 is a square wave of constant amplitude with each half cycle of the square wave corresponding to a peak or valley of the seismic trace. The square wave output of the limiter 22 is differentiated by differentiator 23 which produces an output of a series of alternate positive and negative spikes. These spikes correspond in time to the axis crossings of the seismic trace. The output from the differentiator is rectified by full-wave rectifier 24, which converts the output of the differentiator to all positive spikes corresponding in time to axis crossings of the seismic trace. The original seismic trace is also rectified by the full-wave rectifier 25. The full-wave rectified seismic trace is applied from the output of rectifier 25 to gate 26. The gate 26 samples the signal applied thereto from the full-wave rectifier 25 a predetermined time interval after each pulse applied thereto from the full-wave rectifier 24. This predetermined time interval is the average time interval from an axis crossing to a peak or valley of a reflection for the particular area. For example, this interval for the Venezuelan gulf is approximately 8.5 milliseconds. If there is a second axis crossing before the end of the predetermined time interval, no sample is taken. As a result, the samples taken by the gate 26 will represent the samples of the function $\Phi(t)$. These samples are produced in time sequence from the output gate 26. The sequential samples are then cross correlated with the operator whose coefficients are $-3, +1, +3, +2, -1, -3, +1$ in cross correlation filter 27. The cross correlation filter most conveniently is a properly programmed digital computer. The filtered output from the cross correlation filter will be the function $\Phi(t)$. From this function $\Phi(t)$, the reflections may be easily picked.

The curve 32 in FIGURE 6 illustrates the results obtained from this process when applied to a typical seismic trace 31. The curve 32 is not actually $\Phi(t)$ but is $\Phi(t)$ with its time scale compressed and stretched so as to correspond with the time scale of the seismic trace 31. As seen in FIGURE 6, the resulting curve is striking. Each reflection that starts out on the original trace is characterized by large positive value outputs. This positive value occurs near the beginning of the reflection. There are no false indications and each reflection is indicated.

The above description is of a preferred embodiment of the invention and many modifications may be made thereto without departing from the spirit and scope of the invention, which is limited only as defined in the appended claims.

What is claimed is:

1. A method of processing a seismic trace comprising the steps of sampling the absolute amplitude of said seismic trace a predetermined time interval after the axis crossings of said seismic trace, said time interval equaling the average interval from an axis crossing to the peak or valley of a reflection for the area from which said seismic trace was obtained, generating a function the periodic sequential samples of which are the samples obtained in said sampling step in the order in which they occur in said seismic trace, and filtering said function to pass a predetermined band of frequencies of said function.

2. A method of processing a seismic trace comprising sampling the absolute amplitude of said seismic trace a predetermined time interval after the axis crossings of said seismic trace, said predetermined time interval equaling the average time from an axis crossing to the peak or valley of a reflection for the area from which said seismic trace was obtained, generating a function the periodic sequential samples of which are the samples obtained in said sampling step in the order in which they occur in said seismic trace, and cross correlation filtering said function with an operator whose coefficients are $-3, +1, +3, +2, -1, -3,$ and $+1$.

3. A method of processing a seismic trace comprising generating a function the periodic sequential samples of which are the absolute values of the peaks and valleys of said seismic trace in the order in which they occur in said seismic trace, and cross correlation filtering said function with an operator whose coefficients $-3, +1, +3, +2, -1, -3,$ and $+1$.

References Cited in the file of this patent

UNITED STATES PATENTS

| | | |
|---|---|---|
| 2,835,746 | Montgomery | May 20, 1958 |
| 2,838,742 | McManis | June 10, 1958 |
| 2,897,477 | Lindsey | July 28, 1959 |